Patented July 4, 1950

2,513,997

UNITED STATES PATENT OFFICE 2,513,997

COATED METAL HYDRIDE

Thomas R. P. Gibb, Jr., Marblehead, Mass., assignor to Metal Hydrides Incorporated, Beverly, Mass., a corporation of Massachusetts No Drawing. Application June 30, 1948,
Serial No. 36,295

10 Claims. (Cl. 252—188)

This invention relates to gas generating compounds and more particularly to compositions containing such compounds for generating a gas at a retarded and controlled rate.

It is well known that the hydrides of certain metals and particularly the hydrides of alkaline earth metals, such as lithium hydride, lithium borohydride, calcium hydride, etc., react with water to produce hydrogen. The reaction takes place rapidly and sometimes even explosively and, when permitted to proceed uncontrolled, heats the reactants to a high temperature. Other gas generating compounds, such as silicides, carbonates, the carbides and nitrides of certain metals, such as the alkali and alkaline earth metals, also react rapidly with water, although in most cases, not as rapidly as the metal hydrides.

The problem of retarding these reactions at a desired controlled rate has been studied by many investigators. Attempts have been made to retard the reactivity of such compounds with aqueous liquids by mixing, impregnating or coating with an inert hydrophobic substance, such as paraffin wax, naphthalene, mineral oil, tar, Vaseline, various petroleum products, etc. It also has been proposed to assist impregnation with hydrophobic substances by mixing with the latter a small amount of a substance, such as a soap, possessing low surface tension and capable of communicating this property to the impregnating medium.

I have discovered that hydrophobic substances of the general type employed by the prior art, unless an extremely and uneconomically large proportion is employed, are ineffective to retard appreciably the reactivity of aqueous liquids with gas generating compounds, such as calcium hydride.

The present invention is based in part upon my discovery that the water reactivity of a solid, water reactive gas generating compound of a metal, such as calcium hydride, can be retarded and controlled effectively by providing finely divided particles thereof with a solid coating comprising certain water insoluble organic acids. The particle size of the gas generating compound should not exceed about 20 mesh. The retarding effect of the coating is increased if the particle size of the gas generating compound is considerably smaller, for example 50 to 200 mesh. The water reactivity is further retarded by compacting the coated particles under a heavy pressure of from 5 to 30 tons per square inch to form small pellets. The acids I have found suitable have the general formula $R(X)n$ where $n$ is an integer and R is a radical containing not less than six or more than forty carbon atoms and is selected from radicals consisting of a hydrocarbon radical, a hydrocarbon radical having an ether (—C—O—C—) group, a hydrocarbon radical containing a ketone group, a hydrocarbon radical containing an ester group, and a hydrocarbon radical containing an OH group, and X is a COOH or $SO_3H$ group, the ratio of the number of carbon atoms in said acid to the combined number of X and OH groups being not less than 6 to 1. Particularly suitable coating materials may comprise the fatty acids having the general formula $C_mH_{2m+1}COOH$, where $m$ is an integer from 6 to 40. The coating may include a water insoluble reaction product of the gas generating compound and the acid used. If the reaction product of the gas generating compound and the organic acid used is a water soluble salt, a method for forming the coating should be used which avoids or reduces to a minimum the formation of such salt.

As the amount of these compounds in the composition is gradually increased from zero up to about 3 per cent based upon the weight of the composition, slight retardation of gas evolution is obtained. As the amount is further gradually increased, however, retardation of the rate of gas evolution is rapidly increased. Thus, physically similar pellets of substantially the same weight consisting of finely divided particles of about —50+200 mesh of calcium hydride (90 per cent purity) coated and formed by the same method with 2.5, 3, 3.5, 4 and 5 per cent by weight of stearic acid respectively and compacted under heavy pressure required 3.5, 5, 9, 15 and 27 seconds to generate one liter of hydrogen. A physically similar pellet in which particles of calcium hydride are coated by the same method with 35 per cent paraffin by weight and no stearic acid required less time to generate one liter of hydrogen than the pellet containing only 2.5 per cent stearic acid.

Illustrative examples of water insoluble organic acids which may be employed are stearic, lauric, myristic, palmitic, cyclohexylacetic, n- decyl acrylic, oleic, linoleic, linolenic, ricinoleic, sebacic, stearylmalonic, ω-phenyl-n-butyric, p-toluic, diphenic, 4-n-octylphthalic, anthracene monocarboxylic, p-stearoxybenzoic, ω-n-butoxy-n-butyric, dihydroricinoleic, p-hexadecyloxybenzenesulfonic, dodecylbenzene-3, 5-disulfonic, hexadecane sulfonic, octadecane sulfonic, dodecyl to hexadecyl benzene-sulfonic acids, keto acids such as o-n-butyrylbenzoic acid, ester acids such as n-octyl acid phthalate, partial copolymers of butadiene or styrene and acrylic acid, partial polymers of p-vinylbenzoic acid, etc. I refer to these acids as metallophilic agents.

I have discovered further that the water reactivity of a solid water reactive gas generating compound of a metal can be more effectively retarded when the coating on the particles includes an organic acid of the type previously mentioned together with a small amount of a water repellant or hydrophobic material, such as paraffin. This result is not merely the additive effect of the metallophilic and hydrophobic agents because a marked increased retarding effect is obtained when the amount of hydrophobic agent so used is within the range of amounts which if used alone exerts no substantial retarding action. Thus, physically similar masses of substantially the same weight comprising finely divided particles of −50+200 mesh of calcium hydride (90 per cent purity) coated by the same method with 5 per cent by weight of stearic acid together with 2, 5 and 7 per cent by weight of paraffin respectively and compacted under substantially the same heavy pressure required 47, 69 and 234 seconds to generate one liter of hydrogen when reacted with water.

The hydrophobic agent should be a material which (1) is water repellant, (2) is capable of cohering and (3) is miscible with the metallophilic agent. Particularly suitable hydrophobic materials are those having a large substantially hydrocarbon molecule, such as paraffin, and microcrystalline petroleum wax; polymeric esters of the type of ester gum; asphalt; tar; silicone resins; natural waxes; high melting fats; glyptol resins, such as glycerol-phthalic anhydride resins; substantially hydrocarbon polymers and their halide substituted polymers, such as polyisobutylene, polyisoprene, polybutadiene, polystyrene and polyvinyl chloride; polymerizable esters and nitriles of unsaturated acids, such as acrylonitrile, methacrylonitrile, methyl methacrylate, etc. The monomer or partial polymer may be used and the polymerization completed in the presence of a catalyst and the gas generating compound, such as calcium hydride. For practical reasons, the hydrophobic agent should be one which either is soluble in an inert low boiling solvent, such as carbon tetrachloride, chloroform, ligroin, etc., or which melts or flows freely at a low temperature but preferably at not less than 60 to 70° C. but lower than about 200° C. The hydrophobic agent, if a polymerizable monomer, should be capable of being polymerized at a low temperature, such as about 130° C. or less.

Thus, in accordance with the invention, I may produce a composition which is essentially calcium hydride and a relatively small amount of retarding agent, e. g. stearic acid with or without a relatively small amount of hydrophobic adhesive agent, and which, when reacted with an aqueous liquid, will generate hydrogen at practically any desired controlled rate. Similar compositions for generating a gas at a desired controlled rate may be produced by using, in place of calcium hydride, other metal hydrides or other solid, water reactive, gas generating compounds of metals or metalloids, such as lithium hydride, lithium borohydride, calcium carbide, etc.

In producing the composition of the invention, finely divided particles of the solid, gas generating compound, such as calcium hydride, may be coated with the retarding agent, such as stearic acid, with or without a hydrophobic agent, in any desired manner. Thus, the retarding agent, such as stearic acid or paraffin and stearic acid, may be melted and thoroughly mixed with the solid, gas generating compound at whatever temperature the mix is least viscous or the components may be placed in a mill and ground until a uniform mixture is obtained. The gas generating compound may be added to a vessel containing a solution of the retarding agent, thoroughly mixed, and the solvent evaporated off. Any inert solvent is suitable, such as carbon tetrachloride, benzene, a low boiling ether, dioxane, ligroin, octane, etc. In some cases, best results are obtained by first coating the particles of gas generating compound with the metallophilic agent and thereafter coating with the hydrophobic agent. I prefer to employ a metallophilic agent which is solid at room temperature and melts at a temperature greater than about 60° C.

An important advantage of the present invention is the relatively small proportion of retarding agent required. When the proportion of retarding agent does not exceed about 15 to 20 per cent by weight of the composition, and the components are thoroughly mixed, the resulting product has the appearance of a dry powder. This powder may be mixed with an inert liquid vehicle, such as linseed oil, to form a composition having the consistency of a paint, paste or the like in which the coated particles may be suspended. The powder consisting of the coated particles may be used as such for the generation of gas by reaction with water. However, I prefer to form small compacted self sustaining articles or pellets by subjecting the powder to heavy pressure of the order of 5 to 30 tons per square inch.

In some instances, when the composition is reacted with water a slight scum accumulates upon the surface of the water. This can be minimized by incorporating in the composition, during mixing of the gas generating compound with the retarding agent, from about 0.2 to 0.6 per cent by weight of an alkali stable wetting agent, such as long chain alkyl and alkaryl sulfates and sulfonates and alkylated sulfo-succinic acid and derivatives of the Cellosolves. Suitable wetting agents are the alkali stable wetting agents which do not form an insoluble salt with the metal component of the gas generating compound.

The keeping qualities of the pellets, that is, their resistance to water vapor, is improved by dipping in molten paraffin, or preferably in a warm saturated solution of paraffin in carbon tetrachloride, so as to obtain a thin coating of paraffin. Other water repellent materials of the type previously mentioned may be employed for this purpose.

The invention is illustrated by the following specific examples.

Example I

My preferred method involves the addition of 10 parts of stearic acid, flaked from a pressed cake of pure material, and 7 parts of paraffin chips to 88 parts by weight of −60 mesh calcium hydride. After mixing, the composition is heated to approximately 120° C. and stirred. It shortly becomes pasty and after stirring for 15 minutes it is cooled to 35–40° C. and forced through a coarse screen. After screening, the powder is chilled, further comminuted if necessary, and pressed under a pressure of 30 tons per square inch into pellets one-half inch in diameter and one-half inch long. Pellets so prepared yield in cold water hydrogen gas at an average rate of ca. 1.7 c. c. per second.

*Example II*

100 cc. (93.6 grams) of methyl methacrylate monomer with between 0.01 to 1 per cent of benzoyl peroxide is mixed with 1 gram stearic acid. To the clear solution is added 250 grams of −60 mesh calcium hydride to form a pourable paste. After aging, the mixture is treated in any of the following ways: (1) It may be partly polymerized and then pressed in a heated press to form a pellet. (2) It may be cast in a mold and allowed to polymerize at a temperature not exceeding 50° C. (3) The mixture may be polymerized as in (2), ground to a powder, and hot pressed to form a pellet.

The resulting solid is a gray, glossy material remarkably stable in air. The residue from reaction with water is a granular material. No scum is produced. Too rapid polymerization causes the product to be porous.

I claim:

1. A composition consisting essentially of solid finely divided particles of a water reactive hydride of a metal having a coating consisting essentially of a water insoluble organic acid and a water repellant compound which is solid at normal temperature selected from the group consisting of hydrocarbons and esters which are miscible with said acid, said acid having the general formula $R(X)_n$ where $n$ is an integer, R is a radical having not less than six or more than forty carbon atoms and selected from the group consisting of a hydrocarbon radical, a hydrocarbon radical having an ether group, a hydrocarbon radical having a ketone group, a hydrocarbon radical having an ester group and a hydrocarbon radical having an OH group, and X is selected from the group consisting of COOH and $SO_3H$ groups, the ratio of the number of carbon atoms in said acid to the combined number of X groups and OH groups being not less than six to one, the size of said particles being greater than 20 mesh, said acid being not less than 1 per cent by weight of the composition, said coating being not less than 3 per cent and not more than 20 per cent by weight of the composition.

2. A composition as described by claim 1 in which the water repellant compound is a paraffin wax.

3. A composition as described by claim 1 in which the organic acid is a fatty acid.

4. A composition as described by claim 3 in which the water repellant compound is a paraffin wax.

5. A composition as described by claim 1 in which the organic acid is stearic acid.

6. A compacted self-sustaining article consisting essentially of solid finely divided particles of a water reactive hydride of a metal having a coating consisting essentially of a water insoluble organic acid and a water repellant compound which is solid at normal temperature selected from the group consisting of hydrocarbons and esters which are miscible with said acid, said acid having the general formula $R(X)_n$ where $n$ is an integer, R is a radical having not less than six or more than forty carbon atoms and selected from the group consisting of a hydrocarbon radical, a hydrocarbon radical having an ether group, a hydrocarbon radical having a ketone group, a hydrocarbon radical having an ester group and a hydrocarbon radical having an OH group, and X is selected from the group consisting of COOH and $SO_3H$ groups, the ratio of the number of carbon atoms in said acid to the combined number of X groups and OH groups being not less than six to one, the size of said particles being greater than 20 mesh, said acid being not less than 1 per cent by weight of said coating, said compound being not less than 2 per cent by weight of the composition, said coating being not less than 3 per cent and not more than 20 per cent by weight of the composition.

7. An article as described by claim 6 in which the water repellant compound is a paraffin wax.

8. An article as described by claim 6 in which the organic acid is a fatty acid.

9. An article as described by claim 8 in which the water repellant compound is a paraffin wax.

10. An article as described by claim 3 in which the organic acid is stearic acid.

THOMAS R. P. GIBB, Jr.

REFERENCES CITED

The following references are of record in the file of this patent:

UNITED STATES PATENTS

| Number | Name | Date |
|---|---|---|
| 823,246 | Wessel | June 12, 1906 |
| 980,936 | Federer | Jan. 10, 1911 |
| 1,924,401 | Gilleo | Aug. 29, 1933 |
| 2,274,252 | Tanberg | Feb. 24, 1942 |